US012752429B2

(12) United States Patent
Ramanathan et al.

(10) Patent No.: US 12,752,429 B2
(45) Date of Patent: Oct. 6, 2026

(54) EXEMPLAR ROBOT LOCALIZATION

(71) Applicant: Alarm.com Incorporated, Tysons, VA (US)

(72) Inventors: Narayanan Ramanathan, Chantilly, VA (US); Donald Gerard Madden, Columbia, MD (US); Timon Meyer, Centreville, VA (US); Gang Qian, McLean, VA (US); Daniel Todd Kerzner, McLean, VA (US); Nikhil Ramachandran, Herndon, VA (US); Glenn Tournier, Vienna, VA (US)

( * ) Notice: Subject to any disclaimer, the term of this patent is extended or adjusted under 35 U.S.C. 154(b) by 327 days.

(21) Appl. No.: 17/952,937

(22) Filed: Sep. 26, 2022

(65) Prior Publication Data

US 2023/0099968 A1 Mar. 30, 2023

Related U.S. Application Data

(60) Provisional application No. 63/249,686, filed on Sep. 29, 2021.

(51) Int. Cl.
*B25J 9/00* (2006.01)
*B25J 9/16* (2006.01)

(52) U.S. Cl.
CPC .................................. *B25J 9/1697* (2013.01)

(58) Field of Classification Search
CPC ....... B25J 9/1697; G05D 1/024; G05D 1/104; G05D 1/0297; G05D 1/0274
See application file for complete search history.

(56) References Cited

U.S. PATENT DOCUMENTS

| | | | | |
|---|---|---|---|---|
| 2003/0097202 | A1 | 5/2003 | Fujita et al. | |
| 2016/0378110 | A1 | 12/2016 | Phillips et al. | |
| 2018/0181136 | A1* | 6/2018 | Loosararian | B08B 9/049 |
| 2018/0204469 | A1* | 7/2018 | Moster | B64U 10/13 |
| 2018/0292214 | A1* | 10/2018 | Zhang | G01C 21/005 |
| 2019/0107846 | A1* | 4/2019 | Roy | G05D 1/104 |
| 2019/0146462 | A1* | 5/2019 | Tan | B25J 9/161 700/257 |
| 2019/0248487 | A1* | 8/2019 | Holtz | B64U 70/90 |
| 2019/0378423 | A1* | 12/2019 | Bachrach | B64U 20/87 |
| 2020/0409376 | A1* | 12/2020 | Ebrahimi Afrouzi | G05D 1/0246 |
| 2022/0075975 | A1* | 3/2022 | Peng | B25J 9/1697 |

OTHER PUBLICATIONS

PCT International Search Report and Written Opinion in International Appln. No. PCT/US2022/077082, mailed on Dec. 22, 2022, 14 pages.
International Preliminary Report on Patentability in International Appln. No. PCT/US2022/077082, mailed on Apr. 11, 2024, 7 pages.

* cited by examiner

*Primary Examiner* — Ian Jen
(74) *Attorney, Agent, or Firm* — Fish & Richardson P.C.

(57) ABSTRACT

Methods, systems, and apparatus, including computer programs encoded on computer-storage media, for exemplar generation and localization. In some implementations, a method includes obtaining sensor data from a robot traversing a route at a property; determining sampling rates along the route using the sensor data obtained from the robot; selecting images from the sensor data as exemplars for robot localization using the sampling rates along the route; determining that a second robot is in a localization phase at the property; and providing representations of the exemplars for robot localization to the second robot.

19 Claims, 6 Drawing Sheets

EXEMPLAR ROBOT LOCALIZATION

CROSS-REFERENCE TO RELATED APPLICATION

This application claims the benefit of U.S. Provisional Application No. 63/249,686, filed Sep. 29, 2021, and titled "Exemplar Robot Localization," which is incorporated by reference.

BACKGROUND

A monitoring system for a property can include various components including sensors, cameras, and other devices. For example, the monitoring system may use the camera to capture images of people or objects of the property.

SUMMARY

This specification describes techniques, methods, systems, and other mechanisms for exemplar generation and localization. Localizing a robot may be useful. For example, a property may include a number of robots that complete tasks involving navigating around the property. To successfully carry out missions while avoiding various obstacles that may exist on the property, the robot may use localization processes to determine its location at the property.

In order to perform localization processes, a robot may obtain data from one or more onboard sensors. The sensors may be used to determine an approximate location. In some cases, the robot may supplement sensor data with previously obtained data, such as exemplars, to determine its location with greater accuracy. The exemplars may represent data captured from one or more known locations at a property. The exemplars may include a number of features across one or more types of obtained data (e.g., monocular camera imagery, visual-inertial odometry (VIO), time of flight (TOF), Light Detection and Ranging (LiDAR), sound navigation and ranging (SONAR), and light sensor data among others). Exemplars may be provided to a robot upon request and the robot may compare features across one or more types of data obtained by the requesting robot and features of the obtained exemplar data.

In some implementations, exemplars are generated by a control unit of a system. For example, the control unit may obtain one or more data streams from sensors operating at a property. In some cases, the sensors may be fixed to a robot. The control unit can determine sampling rates for the data streams based on features detected within the data streams. The sampling rates may be used to determine what data frames are selected as exemplars. For example, a sampling rate may be increased if LiDAR sensors detect that a route traverses a doorway connecting rooms. A sampling rate may similarly be increased if a number of detected objects in a visual field satisfies a threshold. A sampling rate may be decreased if sensors become saturated, data is corrupted, or a number of detected features is below a threshold. In this way, exemplars may be selected to reduce storage requirements while maximizing data effective for the localization of robots.

In some implementations, a robot generates and sends exemplar requests to a control unit. The control unit may provide exemplars from among an exemplar set. The control unit may select the exemplars that may be useful for a current mission or at a particular location. The robot may receive the exemplars and may use them for one or more localization processes. In this way, the robot may be constructed at reduced cost with less onboard memory devoted to exemplar data compared to a robot that stores all previously obtained sensor data at a property or a robot that stores all obtained sensor data from all exemplars. In addition, efficiency may improve by processing only the reduced set of applicable exemplars.

One innovative aspect of the subject matter described in this specification is embodied in a method that includes obtaining sensor data from a robot traversing a route at a property; determining sampling rates along the route using the sensor data obtained from the robot; selecting images from the sensor data as exemplars for robot localization using the sampling rates along the route; determining that a second robot is in a localization phase at the property; and providing representations of the exemplars for robot localization to the second robot.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, determining the sampling rates includes detecting one or more features in the sensor data.

In some implementations, actions include adjusting a current sampling rate using the detected one or more features in the sensor data. In some implementations, the one or more features include one or more of the following: detection of objects, detection of object characteristics, detection of objects or characteristics in LiDAR data, visual data, inertial data, velocity of the robot, or positioning data.

In some implementations, selecting the images from the sensor data using the sampling rates along the route includes determining a sampling rate for a portion of the route; and selecting images obtained along the portion of the route at the sampling rate.

In some implementations, each of the sampling rates indicate a number of the exemplars to be selected per a number of data frames captured in the sensor data. In some implementations, actions include obtaining a request from the second robot; and determining that the second robot is in a localization phase at the property using the request from the second robot.

In some implementations, actions include selecting non-visual data from the sensor data as the exemplars for robot localization. In some implementations, the non-visual data includes one or more of LiDAR data, light sensor data, inertial data, positioning data, or SONAR data.

In some implementations, actions include providing non-visual data from the sensor data to the second robot. In some implementations, actions include determining a second route of the second robot; comparing a first set of one or more values representing locations of one or more exemplars of the exemplars with a second set of one or more values representing one or more locations along the second route; selecting a set of one or more exemplars as applicable exemplars; and generating the representations of the exemplars, where the representations include a representation of each applicable exemplar of the applicable exemplars.

In some implementations, the first set of one or more values representing the locations of the set of one or more exemplars of the exemplars and the second set of one or more values representing the one or more locations along the second route are coordinate values representing space in a coordinate system.

In some implementations, actions include obtaining an approximate location of the second robot; determining a set of one or more exemplars from the exemplars that satisfy a matching threshold with the approximate location; and generating the representations of the exemplars, where the representations include a representation of each exemplar of the set of one or more exemplars.

In some implementations, actions include obtaining data from a monitoring system at the property indicating the second robot is either traversing, or will traverse, a specific route; determining a set of one or more exemplars from the exemplars that satisfy a matching threshold with locations along the specific route; and generating the representations of the exemplars, wherein the representations include a representation of each exemplar of the set of one or more exemplars.

Another innovative aspect of the subject matter described in this specification is embodied in a non-transitory computer-readable medium storing one or more instructions executable by a computer system to perform operations that include obtaining sensor data from a robot traversing a route at a property; determining sampling rates along the route using the sensor data obtained from the robot; and selecting images from the sensor data as exemplars for use providing representations of the exemplars for robot localization at the property by a second robot.

Another innovative aspect of the subject matter described in this specification is embodied in a system, that includes one or more computers and machine-readable media interoperably coupled with the one or more computers and storing one or more instructions that, when executed by the one or more computers, perform operations that include determining that a robot is in a localization phase at a property; and providing, to the robot, representations of exemplars, selected as images from sensor data obtained from a second robot using sampling rates, for robot localization.

The details of one or more implementations are set forth in the accompanying drawings and the description, below. Other potential features and advantages of the disclosure will be apparent from the description and drawings, and from the claims.

DETAILED DESCRIPTION

Figure 1:
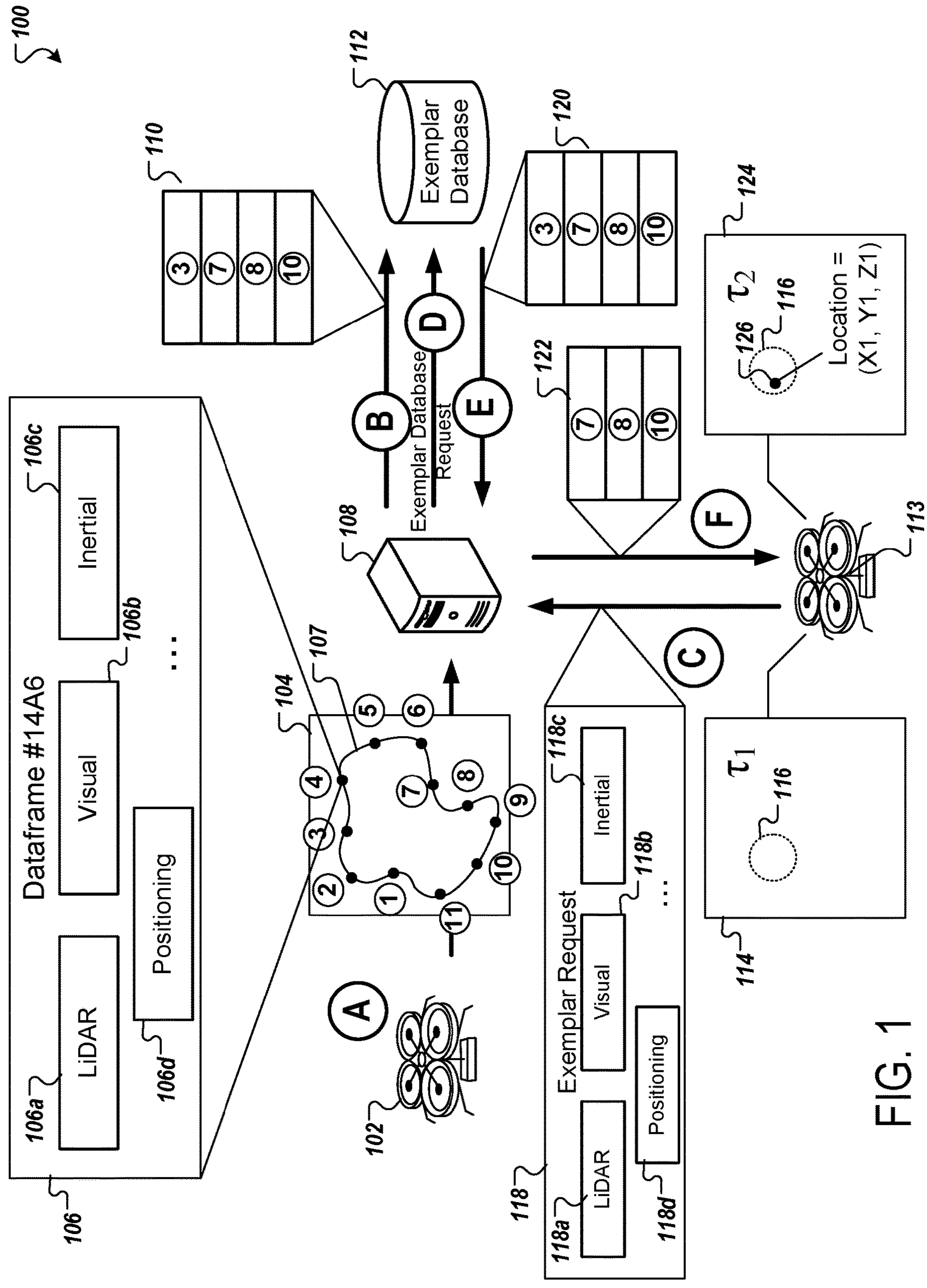
FIG. 1 is a diagram showing an example of a system for exemplar generation and localization.

FIG. 1 is a diagram showing an example of a system 100 for exemplar generation and localization. The system 100 includes a drone 102, a control unit 108, an exemplar database 112, and a drone 113. The drone 102 sends obtained data 104 to the control unit 108. After processing the data 104, the control unit 108 sends a selected portion of the data 104 as exemplars 110 to the exemplar database 112. The drone 113 sends an exemplar request 118 to the control unit 108. The control unit 108, after processing the exemplar request 118, obtains exemplars 120 from the exemplar database 112. The control unit 108 processes the exemplars 120 to select exemplars 122 to provide to the drone 113. The control unit 108 provides the exemplars 122 to the drone 113.

Although the drone 102 and the drone 113 are depicted in FIG. 1 as aerial drones, the drone 102 and the drone 113 may be any type of device with equipped sensors or with navigation capabilities. In some implementations, one or more sensors may perform actions attributed to the drone 102. For example, instead of obtaining the data 104 from the drone 102, the control unit 108 may obtain data from sensors that are not affixed to a robot but are positioned at a property.

In some implementations, the drone 102 and the drone 113 are the same drone. For example, a given drone, depicted as the drone 102, can obtain data 104. The same drone, depicted as the drone 113, can send the exemplar request 118 and obtain the exemplars 120. In general, the same drone that obtains data for the control unit 108 to generate the exemplars 110 can be the drone that requests and obtains the exemplars 120 selected by the control unit 108.

In some implementations, the control unit 108 includes a processor or other control circuitry configured to execute instructions of a program. A program executed by the control unit 108 may include operations for obtaining and processing the data 104 from the drone 102, sending and obtaining exemplars to and from the exemplar database 112, and obtaining and processing the exemplar request 118. In some cases, the exemplar database 112 may include memory onboard the control unit 108. In some cases, the exemplar database 112 may include memory communicably connected to the control unit 108, e.g., through a wired or wireless network.

In one example, the system 100 of FIG. 1 proceeds from stage A to stage F. In stage A, the drone 102 sends the data 104 to the control unit 108. The data 104 may include one or more data frames. Each data frame includes data of one or more data types. For example, data frame 106 includes LiDAR data 106*a*, visual data 106*b*, inertial data 106*c*, positioning data 106*d*, among others. Data frame 106 is associated with a unique identification "14A6." In general, any form of identification may be used to uniquely identify a data frame.

In some implementations, data frames include data types of varying degrees of quality. In some cases, data may be missing entirely. For example, a data frame may include visual data with clearly defined objects and LiDAR data that is beyond a maximum threshold range and therefore likely inaccurate. Based on the visual and LiDAR data of the data frame, components of the system 100 can determine one or more quality scores of the data frame. Each of the one or more quality scores of the data frame may indicate a relative quality of data stored within the data frame. A quality score may be determined based on comparing data from one or more other data frames or based on a quality score specified by a user.

In some implementations, data with more features are indicated as higher quality than data with fewer features. In the case of visual data, components of the system 100, such as the control unit 108, may determine that data with a large number of detected objects is of higher quality than data with few detected objects. In the case of LiDAR data, the control unit 108 may determine that data with distinct LiDAR characteristics or changes is of higher quality than data with little change or LiDAR measurements that indicate the measurements may be less accurate (such as LiDAR data indicating a far distance, e.g., greater than 10 meters).

In some implementations, a user provides one or more examples of different degrees of quality for one or more data types. For example, the user can provide visual data associated with a user quality indicator. The user may mark an image with blurry features as lower quality than an image with clearly defined features. Using one or more examples provided by a user, the system 100 may determine a quality indicator for one or more data types of data frames based on comparing new data with examples and corresponding quality indicators provided by the user. In some cases, the quality indicator may include a score indicating the quality of data relative to a range including the score.

In some implementations, movement or location of a drone may impact data quality. For example, at a first location, the drone 102 may obtain visual data of high quality as indicated by a quality score. Various location or movement variables, such as adequate lighting or lack of rapid movement, may contribute to higher quality visual data. Components of the system 100, such as the drone 102 or the control unit 108 may determine various location or movement variables based on data from inertial sensors, location sensors, and light sensors, among others. At the first location, the drone 102 may also obtain data of another type which may be of a lower quality than the visual data obtained. For example, the drone 102 may obtain LiDAR data at the first location. The first location may be the center of a large room. LiDAR sensors of the drone 102 may have a maximum distance threshold beyond which measurements may be less accurate. In this case, components of the system 100, such as the control unit 108 or the drone 102, may mark LiDAR measurements indicating measurements satisfying a threshold as lower quality based on known limitations of the current LiDAR sensor used. In general, sensor limitations may be combined with location and movement data in order to determine a likely quality indication of the obtained data of the corresponding data type. In this way, the system 100 may be more likely to determine exemplars with high quality data.

In some implementations, movement of sensors may decrease quality of some data types more than others. For example, rapid movement of visual data sensors may degrade the visual data obtained during the rapid movement. However, other sensors may be able to obtain high quality data in the same circumstance. For example, LiDAR sensors may, depending on other factors of the location such as distance to objects, obtain high quality LiDAR data in spite of rapid movement by the LiDAR sensors. In the case of FIG. 1, if the drone 102 includes both visual data sensors and LiDAR sensors and moves rapidly, the drone 102, or subsequent processing system, such as the control unit 108, can determine the visual data obtained during the rapid movement is of lower quality than the LiDAR data obtained during the rapid movement based on the rapidity of the movement and specifications of the visual and LiDAR sensors. Components of the system 100, such as the drone 102 or the control unit 108, can scale a quality of obtained data based on predetermined expressions relating a quality indication with a (i) particular type or extent of movement or type or extent of environmental condition (e.g., inclement weather, lighting conditions, among others) and (ii) known specifications of sensors used to obtain the data.

In some implementations, components of the system 100 discard frames based on quality. For example, the control unit 108 may determine a quality indication for a first data frame. The quality indication for the first data frame may indicate an average, minimum, maximum, or other result of an expression of one or more quality scores of data types included within the data frame. The control unit 108 may compare the quality indication with a threshold and discard the first data frame based on the quality indication satisfying the threshold.

In some implementations, components of the system 100 discard data within frames based on quality. For example, the control unit 108 may determine a quality indication for data within a first data frame. The control unit 108 may obtain one or more quality examples submitted by a user and compare the one or more quality examples to the data within the first data frame to determine the quality indication. The control unit 108 may compare the data with one or more other data of the same data type from other frames to determine the quality indication. The control unit 108 may obtain movement, location, or environmental sensor data and determine, based on the movement, location, or environmental sensor data, known characteristics of a sensor that obtained the data within the first data frame, and one or more expressions relating a quality score with (i) movement, location, or environmental sensor data and (ii) known characteristics of a sensor that obtained the data within the first data frame. The control unit 108 can use the obtained sensor data, sensor characteristics, and known expressions to determine the quality indication. The control unit 108 may compare the quality indication with a threshold and discard the data of the first data frame based on the quality indication satisfying the threshold.

In some implementations, memory resources are conserved from discarding data. For example, a database, such as the exemplar database 112 includes data frames determined as exemplars. The exemplars may include only data that satisfies a threshold. Data within an exemplar frame that does not satisfy a threshold, may be discarded. In this way, the system 100 may conserve memory. The system 100 may also increase efficiency by discarding, and therefore not processing poor quality data during exemplar determination and retrieval.

In some implementations, data frames of data 104 are obtained by the drone 102 as the drone traverses a route of a property. Route 107 is shown graphically in FIG. 1 as a simplified two-dimensional representation of a route traversed at a property by the drone 102. A coordinate system may be used to indicate a determined location for each data frame of the data 104. Although 11 data frames are shown in the data 104, more data frames may be obtained. For example, data frames along the route 107 between the numbered data frames may be obtained in a given implementation. Each data frame along the route 107, may include data of different types as shown in data frame 106 and discussed further in reference to FIG. 2

The control unit 108 obtains the data 104 from the drone 102. The control unit 108 processes the data 104 and the included data frames, e.g., data **106*a-d* of data frame 106, to detect features of the data 104. The control unit 108 selects frames of the data 104 based on the detected features. The control unit 108 may use a sampling rate which may increase or decrease depending on the features detected in the data 104. The processing and exemplar generation is shown further in FIG. 2** and corresponding written description.

In stage B, the control unit 108 generates exemplars 110 based on the obtained data 104 and processing of the obtained data 104. The exemplars 110 are sent to the exemplar database 112. The exemplar database 112 obtains the exemplars 110 and stores the exemplars 110. In some implementations, the exemplar database 112 may use indexes to organize various exemplars associated with a number of different obtained datasets. Indexes may include geographic information or feature information to aid in retrieval processes. For example, an index may include an indication that the corresponding stored data was captured in a living room of the property or other geographic location. If exemplars for the particular geographic location is needed, the control unit 108, or other processor, may identify, based on the index of the exemplar database 112, data corresponding to a living or other geographic location. The control unit 108 may send the exemplars 110 with corresponding descriptions or identifiers to aid in later retrieval.

In stage C, the drone 113 is in a localization phase. The drone 113 may determine an approximate location 116 as shown in map 114. The approximate location 116 may be determined at a first time (T1). The approximate location 116 may indicate a determined location with a determined degree of uncertainty which may be graphically shown as two-dimensional area. The drone 113 generates an exemplar request 118 and sends the request 118 to the control unit 108. The exemplar request 118 may include data types similar to the data types of the data 104 previously obtained. In the example of FIG. 1, the exemplar request 118 includes data of the same types as data in the data 104. For example, the exemplar request 118 includes LiDAR data 108*a*, visual data 108*b*, inertial data 108*c*, and positioning data 108*d* and the data frame 106 of the data 104 similarly includes LiDAR data 106*a*, visual data 106*b*, inertial data 106*c*, and positioning data 106*d*.

In some implementations, the drone 113 initiates localization after determining drift in a location tracking process has occurred. For example, the drone 113 may be using an inertial-based location tracking system such as VIO to track its location over time based on a known starting location and a series of accelerations corresponding to movements after the known starting location. The VIO method may help to reduce processor usage compared to location methods that rely on object detection in visual sensor data to determine a location. However, drift in the VIO processing may occur where a current location determined by VIO does not match an actual current location of the drone 113. In an actual implementation, a drone 113 may expect to sense a certain object or feature based on an obtained map or known features of a property and does not (e.g., the drone 113 uses visual, LiDAR, SONAR, ToF, light sensors among others to determine that what should be a doorway, according to known, pre-obtained features of a property, is more likely a wall based on the sensor measurements). The drone 113 may then initiate localization processes which may include sending an exemplar request such as the exemplar request 118.

In some implementations, the drone 113 compares one or more values corresponding to sensor differences to a threshold. For example, the drone 113 may determine that sensor discrepancies between an actual and expected sensor value is above an absolute value. The drone 113 may determine that sensor discrepancies between an actual and expected sensor value is above a percentage of one or more of the expected value and the actual value. The drone 113 may determine that sensor discrepancies between an actual and expected sensor value is above a threshold for a ratio between expected and actual (e.g., a ratio may be used where the larger of the expected and actual values is the denominator and the smaller is the numerator and a threshold may be a deviation from 1).

In some implementations, the drone 113 may perform localization periodically. For example, the drone 113 may periodically initiate a localization process (e.g., every minute) and request exemplars according to the determined period of time. In some cases, a rate for localization may increase in service scenarios where accuracy is desired. For example, when grabbing an item, interacting with features of a property, or performing operations in an emergency situation, such as a fire or break-in attempt, the drone 113 may change a localization rate to increase the rate at which it requests and receives exemplars and performs localization. The system 100 may include a system parameter, such as emergency override, or specific missions of the drone 113 may change the rate at which the drone 113 performs localization.

The drone 113 sends the exemplar request 118 to the control unit 108. The control unit 108 obtains and processes the exemplar request 118. The control unit 108 uses the data 118*a-d* of the request 118 to determine which exemplars stored in the exemplar database 112 to provide to the drone 113. In some implementations, the control unit 108 selects exemplars corresponding to a location within a present distance from the approximate location 116 determined by the drone 113. The control unit 108 may determine the approximate location 116 from the exemplar request 118 (e.g., the inertial data 118*c* and the positioning data 118*d*) or the approximate location 116 may be included directly in the exemplar request 118. The control unit 108 may compare the approximate location 116 to locations corresponding to exemplars in the exemplar database 112. Locations corresponding to exemplars may be stored with exemplars and may indicate the location at which the data used to generate the exemplar was obtained.

In some implementations, the approximate location 116 may be determined using visual inertial odometry (VIO). Data of the exemplar request 118, such as the inertial data 118*c* and the positioning data 118*d*, may indicate the approximate location 116 determined using VIO. A center of the approximate location 116, such as a determined location which may be combined with a level of location uncertainty to determine the approximate location 116, may be compared to the locations associated with one or more of the exemplars stored in the exemplar database 112 in order to determine applicable exemplars 122 provided to the drone 113 for the localization of the drone 113.

In stage D and stage E, the control unit 108 retrieves the exemplars 120 from the exemplar database 112. In some implementations, the control unit 108 pre-processes the exemplar request 118 to determine a location or other feature and then obtains one or more exemplars that match either the location or the features (e.g., the control unit 108 may obtain exemplars in a directory of the exemplar database 112 corresponding to a location if the exemplar request 118 indicates the drone 113 is at the location). In some implementations, the control unit 108 obtains one or more exemplars from the exemplar database 112. The control unit 108 may obtain the one or more exemplars from the exemplar database 112 and then process the one or more exemplars with the exemplar request 118 to determine exemplars 122 to send to the drone 113. The control unit 108 can send an exemplar database request to the exemplar database 112 to retrieve one or more exemplars.

In some implementations, an exemplar that matched most with a data obtained by the drone 113 is included in the exemplars 122. For example, the control unit 108 can compare the data 118*a-d* of the exemplar request 118 to the exemplars 120 obtained from the exemplar database 112. Various features included in the exemplar request 118 and the exemplars 120 may be used to determine matches. For example, features of the LiDAR data from the exemplar request 118 and the exemplars 120 may be compared to determine what exemplars match most closely, or within a predetermined threshold. LiDAR features may include the distance from a given LiDAR sensor, such as the LiDAR sensor of the drone 102 and the LiDAR sensor of the drone 113, and objects within three-dimensional space.

In some implementations, the control unit 108 compares features of the visual data 118*b* to features of the visual data of the exemplars 120. For example, the control unit 108 may perform object detection on the visual data 118*b* of the exemplar request as well as the visual data of one or more of the exemplars 120. Each detection may have an associated space and location associated with it. The control unit 108 may compare detections of objects or features within the visual data 118*b* to visual data of the exemplars 120 (e.g., the control unit 108 can determine can compute an overlap area between detections of the visual data 118*b* and detections of the visual data of the exemplars 120). The control unit 108 may compare multiple comparisons to determine which of the exemplars 120 most match the data of the exemplar request 118. The control unit 108 may provide the most applicable or a certain number of most applicable exemplars to the drone 113. In the example of FIG. 1 the control unit 108 provides the most applicable 3 exemplars to the drone 113.

In stage F, the control unit 108 provides the exemplars 122 to the drone 113. As with other data transfers shown in FIG. 1, the exemplars 122 may be sent using a wired or wireless network which connect the control unit 108 to the drone 113. The drone 113 obtains the exemplars 122. The exemplars 122 are a subset of the exemplars stored in the exemplar database 112 that are most applicable for localization processes of the drone 113.

The drone 113 uses the exemplars 122 at a second time (T2) after T1 to perform localization. For example, the drone 113 may determine a distance between an actual current location of the drone 113 and a location associated with one or more of the exemplars 122. The drone 113 may use differences in the locations of various objects or differences in sensor measurements between the data obtained by the drone 113 and the data of the exemplars 122. For example, the drone 113 may detect a feature with a size and angle in visual data obtained by the drone 113 and compare it with the feature represented in one or more of the exemplars 122. The feature may be recognized by certain characteristics, such as color or shape. A difference in size and angle between the feature represented in data obtained by the drone 113 and the feature represented in the data of the exemplars 122 may indicate a difference in where a sensor was when it obtained the corresponding data. The location difference from such a comparison may be applied to the known location associated and included with the exemplars 122 and may indicate a current location of the drone 113.

In some implementations, data obtained by the drone 113 used by the drone 113 to compare with data of the exemplars 122 for localization is obtained after receiving the exemplars 122. For example, after receiving the exemplars 122, the drone 113 may re-obtain data similar to the data 118*a-d* included in the exemplar request 118. The data obtained by the drone 113 after receiving the exemplars 122 may be more current than the data 118*a-d* of the exemplar request 118 especially if the drone 113 has moved since sending the exemplar request 118.

In some implementations, an elapse time threshold is used to determine whether to re-obtain data. For example, the drone 113 may start an elapse time counter at the time it sends the exemplar request 118 to the control unit 108 or at the time corresponding to when the data 118*a-d* of the exemplar request 118 was obtained by sensors of the drone 113. In some cases, the data 118*a-d* includes timestamps indicating when the data 118*a-d* was obtained. If the elapse time counter satisfies a threshold when the exemplars 122 are received, the drone 113 may determine to re-obtain data of the exemplar request 118 so as to more accurately determine its location.

The drone 113 uses the exemplars 122 to determine location 126 as shown on map 124. The location 126 exists within the predicted area of the approximate location 116. In some cases, if the location 126 satisfies a difference threshold when compared to the area of the approximate location 116, the drone 113 may re-request exemplars or may redetermine a location based on the obtained exemplars 122. Checking the determined location 126 against the approximate location 116 may prevent the drone 113 from propagating a mistake in localization to subsequent navigation actions. In some cases, the determined location 126 is updated as the current location of the drone 113 and the drone 113 may continue a route or task using the location 126 as a base from which to track differences in order to maintain a current location. As mentioned, the drone 113 may use VIO to track location changes from the location 126 after localization using the exemplars 122.

In some implementations, the control unit 108 performs adjustments on the data 118*a-d* of the exemplar request 118 based on the data 118*a-d*. For example, the control unit 108 may determine a time when the data 118*a-d* was obtained and adjust the data 118*a-d* to account for an elapse time between receiving the exemplar request 118 from the drone 113 and an expected time corresponding to providing exemplars 122 to the drone 113 or expected time corresponding to the drone 113 performing localization using the exemplars 122. The control unit 108 may adjust various features of the data 118*a-d*. For example the control unit 108 may use a timestamp corresponding to the data 118*a-d* and inertial data 118*c* or other type of data, such as a projected route or path, to determine how the drone 113 will likely move during the elapse time. The control unit 108 can then provide exemplars that more closely match the data 118*a-d* adjusted as if the sensors obtaining the data 118*a-d* where at a location indicated by predicting the path of the drone 113. Geometry of shapes and three-dimensional indications from the data 118*a-d* may be used to predict the view of shapes as they would be viewed from a predicted future location of the drone 113.

In some implementations, exemplars with the greatest number of matching features are provided to the drone 113. For example, the control unit 108 may determine a number of visual features in one or more exemplars 120 obtained from the exemplar database 112. The visual features determined by the control unit 108 may be used to uniquely identify one or more objects represented in the data of the exemplars 120 obtained from the exemplar database. The control unit 108 may determine a number of visual features in the data 118*a-d* of the exemplar request. The visual features determined from the data 118*a-d* may also be used to uniquely identify one or more objects represented in the data 118*a-d* as is known in the art. The control unit 108 may then determine how many objects represented in the exemplars match objects represented in the data 118*a-d*. The control unit 108 may provide the exemplar with the most matches or multiple exemplars based on a ranking of most matches depending on implementation.

In some implementations, exemplars with a large number of features may be selected over exemplars with few features. For example, as discussed herein, the control unit 108 may determine features of the data from the exemplars. In the case of visual data, the exemplars with a large number of detected objects may be selected over an exemplar with few detected objects. In the case of LiDAR data, exemplars with distinct LiDAR characteristics or changes may be selected over an exemplar with little change or LiDAR measurements that indicate the measurements may be less accurate (such as LiDAR data indicating a far distance, e.g., greater than 10 meters).

Figure 2:
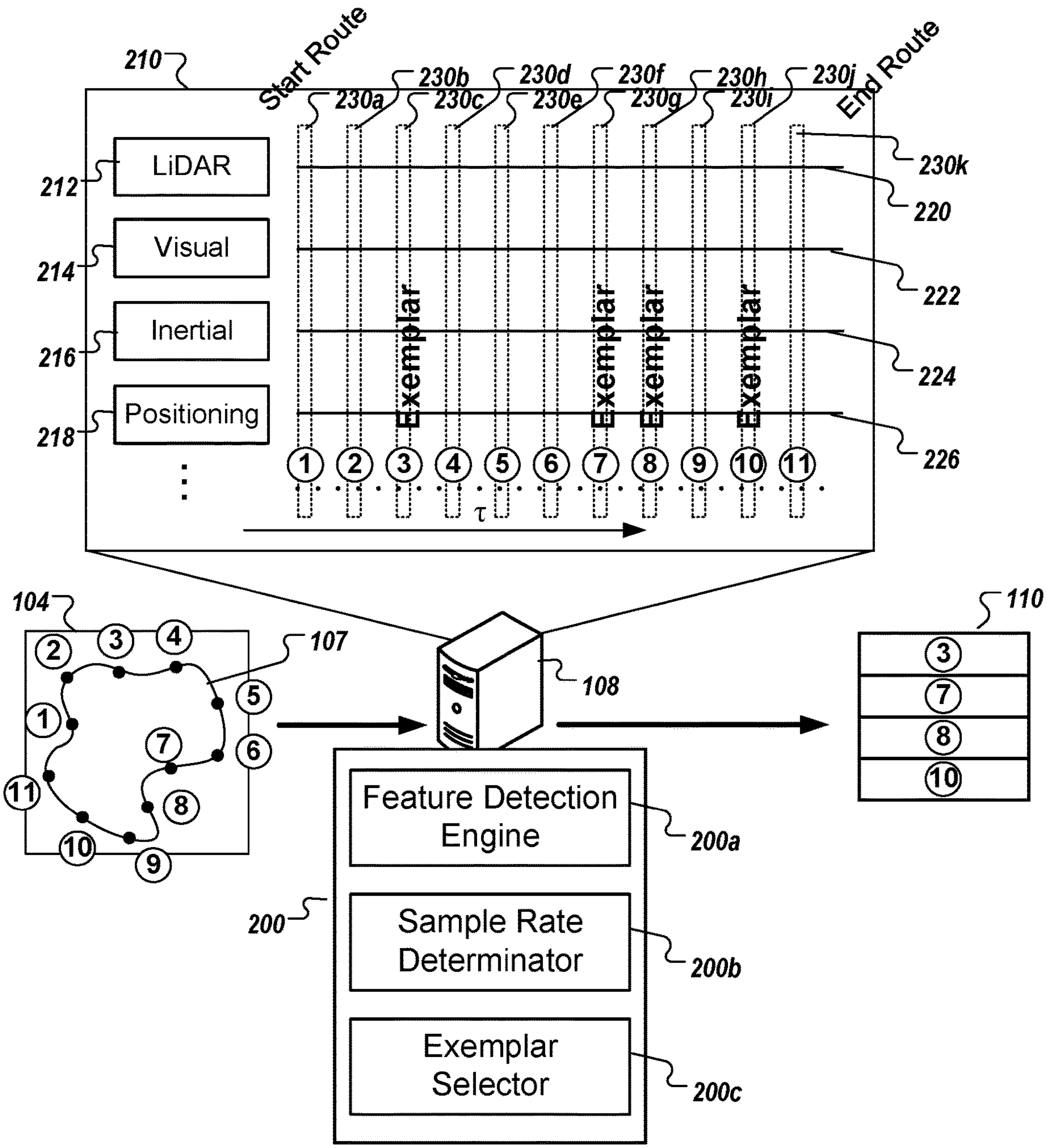
FIG. 2 is a diagram showing an example of a control unit generating exemplars.

FIG. 2 is a diagram showing an example of the control unit 108 generating exemplars 110. The control unit 108 is shown as in FIG. 1 with greater detail as to the processing of the data 104.

The control unit 108 obtains the data 104. As shown in FIG. 1, the data 104 may be obtained by a drone, robot, or other device or sensor. The data 104 may be sent or retrieved by the control unit 108 over a communications network. The data 104 includes multiple data frames which include data of one or more different types. The data 104 is shown graphically in 210 as processed by the control unit 108. The data 104 includes data frames 230*a-k*. The data 104 may include more than the data frames 230*a-k* but, for ease of explanation, we will consider only data frames 230*a-k*.

The data frames 230*a-k* include different data types. For example, as shown in 210, the data frames 230*a-k* include frames from a LiDAR data stream 220 of the LiDAR data type, a visual data stream 222 of the visual data type, an inertial data stream 224 of the inertial data type, a positioning data stream 226 of the positioning data type, among others. In general, any number or types of data may be obtained as the data 104 and processed by the control unit 108.

In some implementations, at least some of the data frames 230*a-k* can include different types of data than the other data frames 230*a-k*. For instance, a first data frame 230*a* can include LiDAR data, visual data, and positioning data and a second data frame 230*a* can include visual data, inertial data, and positioning data.

The data frames 230*a-k* correspond to the locations shown in the graphical representation of the data 104. For example, data frame 230*a* corresponds to the beginning of the route 107 and includes data of different types as captured at a time and place at a property. For discussion purposes, data frame 230*a* will be considered. Data frames b-k include traits and features similar to the data frame 230*a* as discussed herein.

The data frame 230*a* includes LiDAR data from the LiDAR data stream 220. The LiDAR data stream 220 may be obtained from one or more LiDAR sensors over a period of time. The data frame 230*a* includes data from the LiDAR data stream 220 over a subset of the period of time. The one or more LiDAR sensors may obtain measurements in one or more dimensions. The measurements may indicate distances from the one or more LiDAR sensors to various objects at a property. The LiDAR sensors may be affixed to a drone, robot, or electronic device.

The data frame 230*a* includes visual data from the visual data stream 222. The visual data stream 222 may be obtained from one or more visual data sensors over a period of time. The data frame 230*a* includes data from the visual data stream 222 over a subset of the period of time. The one or more visual data sensors may include camera devices. In some cases, the visual data sensors obtain visual data that depicts one or more objects of a property using pixels. The pixels may include parameters indicating an intensity or color in order to represent objects. The visual data sensors may be affixed to a drone, robot, or electronic device.

The data frame 230*a* includes inertial data from the inertial data stream 224. The inertial data stream 224 may be obtained from one or more inertial data sensors over a period of time. The data frame 230*a* includes data from the inertial data stream 224 over a subset of the period of time. The one or more inertial data sensors may include accelerometers and the like to determine changes in forces operating on or by the one or more inertial data sensors or attached device. In some cases, the inertial data sensors obtain inertial data in the form of values indicating acceleration in one or more dimensions. For example, the inertial data sensors can determine that acceleration during the time period of the data frame 230*a* is 0 in an x direction, 3 m/s/s in a y direction, and 0.2 m/s/s in a z direction. The inertial data sensors may be affixed to a drone, robot, or electronic device.

The data frame 230*a* includes positioning data from the positioning data stream 226. The positioning data stream 224 may be obtained based on input from one or more sensors or computational processes. For example, the drone 102 include one or more sensors and one or more processors to process the data from the one or more sensors to obtain the data 104. The drone may determine the positioning data stream 226 from inertial data, such as accelerometer data, and a starting known location. In some cases, the positioning data stream 226 may include locations determined using a form of VIO or other inertial-based location tracking. By tracking the location using inertial the drone 102 may reduce energy usage compared to drones that use object detection in visual images. The positioning data stream 226 may track the determined location of the drone 102 location.

In some implementations, the positioning data stream 224 is supplemented with known data to improve accuracy of the locations indicated by the positioning data stream 224. For example, the drone 102 may be walked by a user through a route with locations that are known. The known locations may be waypoints along the known route that has been traversed. The control unit 108 or the drone 102 may generate the positioning data stream 224 based on the known locations. For example, the control unit 108 or the drone 102 can determine that a location indicated by the VIO of the drone 102 is not on the route 107. The locations along the route 107 may be obtained by the drone 102 or the control unit 108 to determine whether the positioning data stream 224 is consistent.

In some implementations, a user enters locations for waypoints along the route 107. For example, the data 104 may be augmented with manually location information entered by a user. A user with known locations along the route 107 may enter the data periodically while confirming that the drone 102, or other device used to obtain the data 104, is accurately located. In some cases, a detected localization device based on GPS or property-based triangulation location systems, may be used to obtain accurate location measurements. The accurate location measurements may be included in the positioning data stream 224 to increase accuracy in the exemplars to be generated.

In some implementations, the drone 102 performs precise localization along the route 107 when generating the data 104. For example, the drone 102 may use more intensive visual detection methods when traversing the route 107 and obtaining the data 104. The more intensive visual detection may be used to generate the positioning data stream 224. In this way, the positioning data stream 224 may be more accurate that a positioning data stream generated based on VIO. In some cases, VIO may still be used but localization using visual detection may be performed more regularly to increase accuracy of the locations indicated by the positioning data stream 224.

Other data types may be obtained and included in the data 104. For example, time of flight (ToF) sensors may be used to obtain ToF data indicating depth information at a property. SONAR sensors may be used to compliment or perform similar roles as LiDAR when available. Light sensors may be used to characterize the space based on detected illumination (e.g., high illumination likely correlated to proximity or orientation towards artificial or natural light source). In general, any suitable data types may be obtained and included in data frames, such as the data frames 230*a-k*. The control unit 108 processes each of the data frames 230*a-k* according to processes shown in item 200. Again, referring to data frame 230*a*, a feature detection engine 200*a* of the control unit 108 processes the data frame 230*a* to determine one or more features. Features may include visual detection of objects or characteristics in LiDAR data, visual data, inertial data, positioning data, or other data included in the data frame 230*a*. For example, features may be indicated by LiDAR data based on sensor measurements detected within the LiDAR data stream 220 (e.g., a horizontal distance of 10 m in a data frame may indicate a feature of the LiDAR data).

In another example, features may be indicated by visual data based on object detection or object tracking algorithms. The feature detection engine 200*a* may detect objects within the visual data stream 222 and within data frames 230*a-k*. In another example, features may be indicated by changes in velocity as measured by one or more sensors (e.g., accelerometers) collecting inertial data of the inertial data stream 224. In another example, features may be indicated by positioning data based on determined locations of the sensors obtaining the data 104, such as a determined location at a property, as indicated by the positioning data stream 226.

The feature detection engine 200*a* of the control unit 108 is used to detect one or more features in the data streams of the data 104. Detection of features are then used by the sample rate determinator 200*b* to determine a sample rate for exemplar selection. For example, the sample rate determinator 200*b* may associate features, or feature changes, with either increasing, decreasing, or maintaining a sample rate of exemplars. The control unit 108 may select exemplars from data frames 230*a-k* based on the sample rate generated by the sample rate determinator 200*b*.

In some implementations, the feature detection engine 200*a* may process one or more adjacent data frames to determine changes of features. For example, the data frame 230*c* may have been obtained subsequent to one or more data frames subsequent to the data frame 230*b* and before one or more data frames obtained before the data frame 230*d*. These adjacent data frames may be used to determine features used for processing the data frames 230*a-k*. In some cases, the number of adjacent frames used may be determined based on the movement of the sensors obtaining the data 104. For example, if the sensors are moving rapidly, more adjacent data frames may be processed than if the sensors are moving more slowly.

The sample rate in the example of FIG. 2 starts at 0. In some cases, the sample rate may start at a non-zero value. The feature detection engine 200*a* processes data frame 230*c* and determines one or more features based on the data of the data frame 230*c*. The sample rate determinator 200*b* obtains the one or more features and determines, based on the features, to increase the sample rate to 1 exemplar per 4 data frames. The rate may also be expressed as a number of exemplars per unit of time. As discussed, there may be greater or fewer data frames in a given implementation.

The sample rate determinator 200*b* may increase, decrease, or maintain a sample rate for a number of reasons depending on the features detected by the feature detection engine 200*a*. For example, the sample rate determinator 200*b* may obtain feature data from the feature detection engine 200*a* processing one or more data frames adjacent to the data frame 230*c*. The sample rate determinator 200*b* may determine that data frames adjacent to and including the data frame 230*c* include similar features, such as visual features. The similarity of features may indicate that the area includes features effective for localization. The similarity of features may be used to increase a value indicating a likelihood of increasing the sample rate. The value may be balanced with other feature data to determine if the sample rate should be increased, decreased, or be maintained.

In some implementations, the feature detection engine 200*a* uses a confidence threshold to determine whether features are present in data frames. For example, a user may set a preset threshold. If the confidence threshold for a feature detection satisfies the preset threshold, the feature detection may be recorded. If the confidence threshold for a feature detection does not satisfy the preset threshold, the feature detection may be discarded. In some cases, the preset threshold may be a numerical score based on a confidence threshold scale of 0 to 1. For example, the present threshold may be 0.6.

In some implementations, sensors obtaining the data 104 may rotate or pan to capture more data. For example, if the sensors obtaining the data 104 are fixed to a drone, such as the drone 102, the drone 102 may rotate to capture data in both a horizontal and vertical directions. That is, the drone 102 can pan from left to right, up to down, vice versa, or any combination. The additional data from the pans may be obtained as data frames and checked for features. The feature detection engine 200*a* can detect one or more features in the collection of data frames. The sample rate determinator 200*b* may determine that the objects appear to be similar across the data frames, in which case the sample rate determinator 200*b* may increase a sample rate, or the sample rate determinator 200*b* may determine that one or more objects appearing in at least one of the data frames is not included in another data frame. Each instance of a detected feature appearing in one data frame but not in one or more of a set of adjacent data frames, may contribute to the sample rate determinator 200*b* decreasing a sample rate for exemplar selection.

In some implementations, finding similar features in data streams includes comparing characteristics of the detected features. For example, for visual features, characteristics of the visual features may include shape and color which may contribute to an identifier that uniquely identifies the feature which may be an object. If the detection is above a preset threshold, the sample rate determinator 200*b* can compare the detections with detections of adjacent data frames to determine if the same features, as determined by detected shape, colors, or other parameters used for feature recognition, are present in the set of adjacent data frames.

In some implementations, features may be indicated by LiDAR data based on changes in sensor measurements detected within the LiDAR data stream 220. For example, the feature detection engine 200*a* may detect horizontal distance in one data frame as 10 m. The feature detection engine 200*a* may process one or more adjacent data frames and determine that at some later time, the horizontal distance as measured with LiDAR sensor changes to 0.6 m. The sample rate determinator 200*b* may process a collection of data frames which include the at least two data frames processed by the feature detection engine 200*a* and determine that the two data frames are within a determined distance from one another and the change satisfies a threshold. The change may be compared to known phenomenon to determine how to change the sample rate. For example, the control unit 108 may obtain rules that include, if the horizontal measurement changes on the LiDAR data from a value above a certain value to a value below a certain value, increase the sample rate. In some cases, this may be included to ensure that exemplars are selected at a greater rate near a doorway.

In some implementations, the control unit 108 obtains rules for processing the data frames 230*a-k*. For example, the feature detection engine 200*a* may operate according to a threshold rule where only feature detections above a preset confidence threshold, specified in the rules, are used for subsequent processing by the sample rate determinator 200*b*. In another example, the sample rate determinator 200*b* may operate according to rate change rules based on changes detected in the features processed by the feature detection engine 200*a*.

In some implementations, rate change rules obtained by the control unit 108 may include conditional statements based on detected features. Rate change rules may be programmed by a user or learned overtime in a supervised or unsupervised learning environment. For example, rate change rules may include a conditional statement that if a first feature is present in a first data frame, and the first feature is also present in a second data frame, which is adjacent to the first data frame based on a current velocity of the sensors obtaining the data frames (e.g., the amount of data frames may increase or decrease depending on the rate at which the sensors move through a property), then the sample rate should increase because the area may be feature rich.

In another example, rate change rules may include a conditional statement that, if inertial features change, sample rate should increase. In some cases, a device transported sensors obtaining the data 104 may rapidly accelerate. The acceleration may be detected by the sample rate determinator 200*b* which compares features detected by the feature detection engine 200*a*. The sample rate determinator 200*b* may determine that the inertial features increased above a threshold specified in the rate change rules. The rate change rules may specify a rate increase in proportion to the degree of change in features so that a greater change in features may result in a greater change in sample rate and vice versa.

In some implementations, features may be indicated by positioning data based on changes in location of the sensors obtaining the data 104. For example, the location of a device transporting the sensors obtaining the data 104 may be recorded in the positioning data stream 226. The location may indicate a room location and a location within the room. In some cases, rate change rules may include a rule that if the room location, detected as a feature by the feature detection engine 200*a*, changes, that the sample rate determinator 200*b* should increase the sample rate. In this way, more exemplars may be selected as the sensors are moving into a new room. It may be beneficial to gather more data at the interface between locations of a property to ensure successful navigation between the locations.

In the example of FIG. 2, the control unit 108 may obtain one or more rules and processes the data frames 230*a-k* based on the one or more rules. The feature detection engine 200*a* detects one or more features in the data frames 230*a-k*. In some cases, the feature detection engine 200*a* may use rules to determine what features to detect in various data streams and what confidence threshold may be required to detect each feature. The sample rate determinator 200*b* detects changes in the one or more features across two or more data frames and uses rate change rules to determine how the sample rate should change in response to feature detection changes.

The sample rate determinator 200*b* obtains detections from the feature detection engine 200*a* and determines that the sample rate, starting at 0, increases to 1 exemplar every 8 seconds. In general, any applicable form of rate may be used including specifying a number of exemplars per number of data frames. In the example of FIG. 2, the data frame 230*c* to the data frame 230*g*, non-inclusive, covers a period of 8 seconds. This range is used for discussion purposes only. In general, data frames may be obtained at any applicable rate. The sample rate to select exemplars from these data frames may similarly be any applicable rate.

Determining by the sample rate determinator 200*b*, an increase of sample rate from 0 exemplars per sec (e/s) to ⅛ e/s at the data frame 230*c*, marks the data frame 230*c* as an exemplar to be selected. Any of the methods discussed herein for changes in features leading to changes in sample rate may be used to change the sample rate at the data frame 230*c*. The changes in features may occur in any of the data streams included in the data 104.

The sample rate determinator 200*b* may either mark all exemplars to be selected and then pass corresponding data to the exemplar selector 200*c* or the sample rate determinator 200*b* may pass data corresponding to each selected exemplar to the exemplar selector 200*c* in order to select the given data frame as an exemplar. The sample rate determinator 200*b* does not increase or decrease the sample rate at data frames 230*d-f* or any intervening data frames. The sample rate determinator 200*b* increases the sample rate at data frame 230*g* from ⅛ e/s to ½ e/s. The sample rate determinator 200*b* marks the data frame 230*g* as an exemplar. The sample rate determinator 200*b* further processes data frame 230*h*. The sample rate determinator 200*b* decreases the sample rate to ¼ e/s and marks data frame 230*b* as an exemplar.

The sample rate determinator 200*b* does not change the sample rate at data frames 230*i-k*. The sample rate determinator 200*b* marks the data frame 230*j* as an exemplar corresponding to the sample rate determined to be ¼ e/s.

The exemplar selector 200*c* obtains data from the sample rate determinator 200*b*, either as the sample rate determinator 200*b* marks data frames for selection or after all data frames have been marked, and selects the data frames indicated as exemplars from the data frames 230*a-k* of the data 104. The exemplar selector 200*c* may then generate a data set of the exemplars 110. The exemplars 110 may then be sent to storage, such as the exemplar database 112 of FIG. 1.

In some implementations, data frames marked for selection are not selected by the exemplar selector 200*c*. In some cases, data frames marked for selection are not selected by the exemplar selector 200*c* based on quality indications. For example, as discussed herein, the control unit 108 or the drone 102 may determine quality indications of data frames, or data within data frames. The exemplar selector 200*c* can check data frames marked to be selected as exemplars to determine if the quality of the data frame, or the quality of data of the data frame, satisfies a threshold for exemplars as discussed herein. If the quality does not satisfy the threshold, the exemplar selector 200*c* can perform alternative processing such as: skipping the selection, selecting an adjacent frame as an exemplar, interpolating between adjacent data frames to generate data of a higher quality that does satisfy the threshold, among other strategies.

In some implementations, components of the system 100 interpolate between data frames. For example, the control unit 108 may determine a data frame, or data within the data frame does not satisfy a threshold. The control unit 108 may compare data from adjacent frames to generate new data to interpolate between frames adjacent to the data frame. The control unit 108 can discard the data frame or the data within the data frame. The control unit 108 can determine, based on features of the adjacent frames, features to generate as the interpolated data to fill the gap of the data frame. If the data frame was initially marked as an exemplar, the exemplar selector 200*c* can select the generated interpolated data as an exemplar instead of the original data frame.

Figure 3:
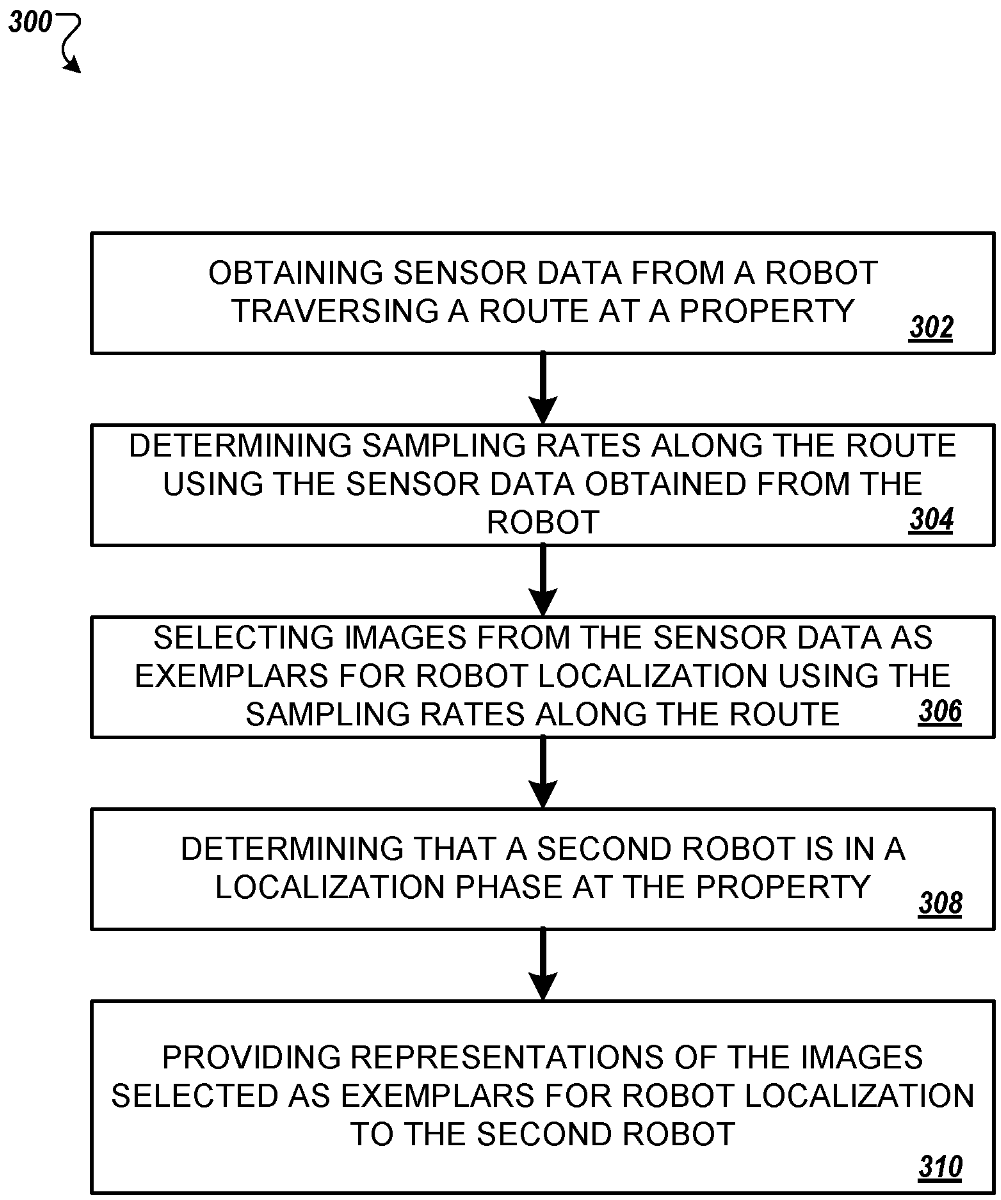
FIGS. 3 and 3B are flow diagrams illustrating example processes for exemplar generation and localization.
Figure 3B:
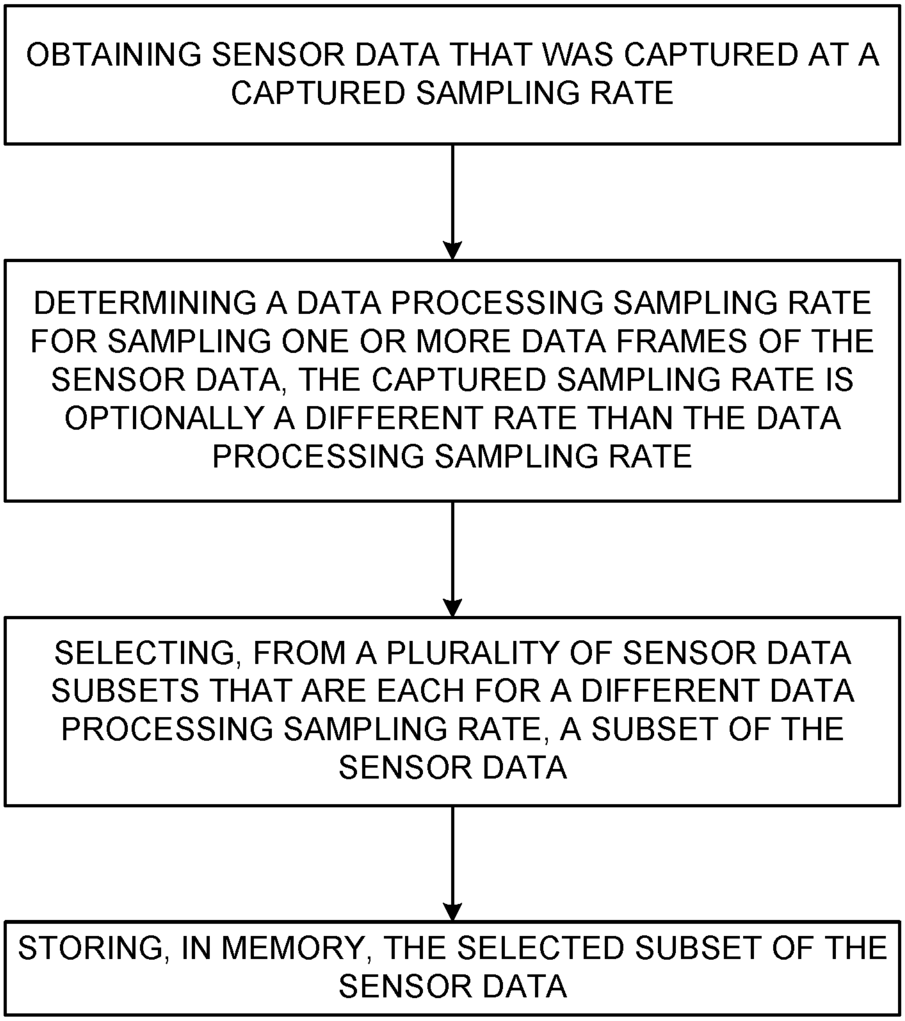

FIG. 3 is a flow diagram illustrating an example of a process 300 for exemplar generation and localization. The process 300 may be performed by one or more electronic systems, for example, the system 100 of FIG. 1.

The process 300 includes obtaining sensor data from a drone traversing a route at a property (302). For example, the control unit 108 of FIG. 1 obtains the data 104 from the drone 102. Data frames of the data 104 may be obtained by the drone 102 as the drone traverses a route of a property, such as the route 107. The data 104 may include one or more data frames. Each data frame includes data of one or more data types. For example, data frame 106 includes LiDAR data 106*a*, visual data 106*b*, inertial data 106*c*, positioning data 106*d*, among others.

The process 300 includes determining sampling rates along the route using the sensor data obtained from the drone (304). For example, the feature detection engine 200*a* of the control unit 108 can process data frames of the data 104 to determine one or more features. The one or more features can be processed by the sample rate determinator 200*b*. The sample rate determinator 200*b* may associate features, or feature changes, with either increasing, decreasing, or maintaining a sample rate of selecting exemplars.

The process 300 includes selecting images from the sensor data as exemplars for drone localization using the sampling rates along the route (306). For example, the exemplar selector 200*c* obtains data from the sample rate determinator 200*b*, either as the sample rate determinator 200*b* marks data frames for selection or after all data frames have been marked, and selects the data frames indicated as exemplars from the data frames 230*a-k* of the data 104. In some cases, the control unit 108 may obtain exemplars in a directory of the exemplar database 112 corresponding to a location if the exemplar request 118 indicates the drone 113 is at the location. The exemplar selector 200*c* may then generate a data set of the exemplars 110. The exemplars 110 may then be sent to storage, such as the exemplar database 112 of FIG. 1.

In some implementations, the process 300 may include selecting non-visual data from the sensor data as exemplars for drone localization. For example, in addition to, or as an alternative to, selecting images from the sensor data as exemplars, the control unit 108 can select other data that may be stored as exemplar data in the exemplar database 112 as exemplars for drone localization, such as localization of the drone 113. The other data may include LiDAR data, light sensor data, inertial data, positioning data, SONAR data, or any other data obtained in the data 104 by sensors and stored in the exemplar database 112.

The process 300 includes determining that a second drone is in a localization phase at the property (308). For example, the drone 113 can generate an exemplar request 118. The drone 113 sends the exemplar request 118 to the control unit 108 to obtain exemplars from the control unit 108 that are applicable to a current localization process performed by the drone 113. The control unit 108 may determine that the drone 113 is in a localization phase based on obtaining the exemplar request 118 sent by the drone 113.

The process 300 includes providing representations of the images selected as exemplars for drone localization to the second drone (310). For example, the control unit 108 can provide the exemplars 122 to the drone 113. The exemplars 122 are a subset of the exemplars stored in the exemplar database 112 that are most applicable for localization processes of the drone 113.

In some implementations, the process 300 may include providing non-visual data from selected exemplar data frames to the second drone. For example, in addition to, or as an alternative to, providing representations of images selected as exemplars, the control unit 108 can provide other data that may be stored as exemplar data in the exemplar database 112 to the drone 113. The other data may include LiDAR data, light sensor data, inertial data, positioning data, SONAR data, or any other data obtained in the data 104 by sensors and stored in the exemplar database 112.

In some implementations, a control unit provides exemplars based on a route of a drone. For example, the control unit 108 may provide exemplar data to the drone 113 based on a route being traversed, or to be traversed, by the drone 113. The route may include navigating from a first location of a property to a second location. The control unit 108 can determine which exemplars in the exemplar database 112 correspond to locations along the route and send those exemplars to the drone 113.

In some implementations, a drone does not send a request for exemplars. For example, the control unit 108 may determine, using monitoring data corresponding to the drone 113 or based on sending data to the drone 113 to traverse a specific route, that the drone 113 is either traversing, or will traverse, the specific route. Based on this determination, the control unit 108 may determine which exemplars in the exemplar database 112 correspond to locations along the specific route and send those exemplars to the drone 113.

In some implementations, a control unit determines which exemplars to provide to a drone. For example, the control unit 108 may compare locations of exemplar data, which identify where data of a given exemplar was obtained at a property, to locations corresponding to the route. The route may include one or more locations that define the route. The one or more locations of the route may be compared with the locations of the exemplar data to determine which exemplars were obtained along the route. These exemplars may then be provided by the control unit 108 to a drone, such as the drone 113. The locations of both the exemplar data and the route may be represented in any suitable format include coordinate values or index values mapped to locations.

In another example, the control unit 108 may determine locations of the exemplar data by comparing features of exemplar data to known locations of the features. The control unit 108 may then compare the determined locations of the exemplars to a route being traversed, or to be traversed, by a drone, such as the drone 113, and provide exemplars to the drone 113 that were obtained at one or more locations along the route.

In some implementations, a drone may receive one or more exemplars and perform localization after determining a subset of exemplars that are closest to a current location. For example, the control unit 108 may provide the drone 113 with exemplars for a route. The control unit 108 may provide the exemplars before the drone 113 traverses the route or during traversal depending on implementation. The drone 113 may obtain the exemplars and determine, either based on locations of the exemplar data or determined locations based on features of the exemplar data, which of the obtained exemplars are closest to a current location of the drone 113. The drone 113 may then, during a localization phase, use only the closest exemplars to update its location. In this way, the drone 113 may more efficiently and effectively perform localization as the data to process is reduced to only the closest exemplars and the processing is decentralized from the control unit 108. In some cases, a threshold number of closest exemplars or all exemplars within a threshold distance of a predicted current location, may be selected as the closest exemplars for localization.

The order of steps in the process 300 described above is illustrative only, and can be performed in different orders. For example, the system can perform two or more of steps 302, 304 and 306 substantially concurrently.

In some implementations, the process 300 can include additional steps, fewer steps, or some of the steps can be divided into multiple steps. For example, the process 300 can include steps 302, 304, and 306 without the other steps in the process 300. The process 300 can include steps 308 and 310 without the other steps in the process 300.

Figure 4:
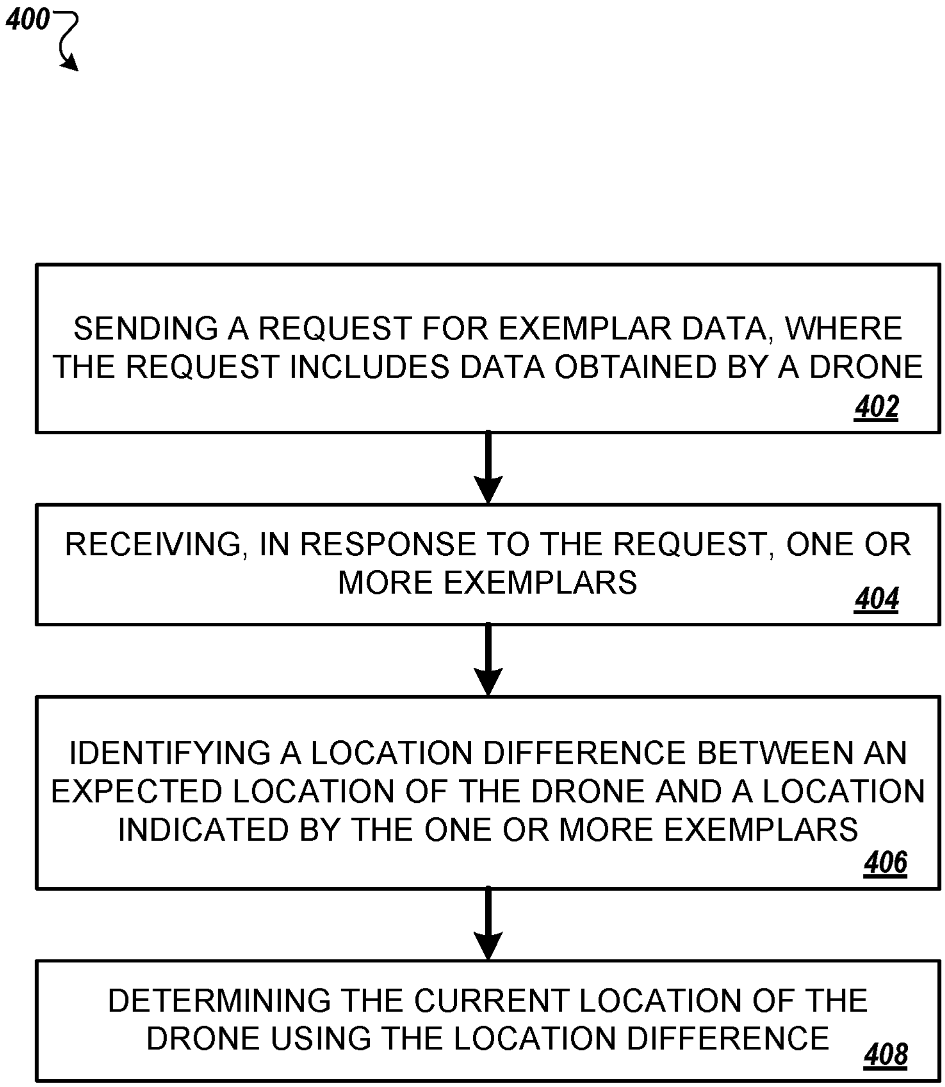
FIG. 4 is a flow diagram illustrating an example of a process for robot localization using exemplars.

FIG. 4 is a flow diagram illustrating an example of a process 400 for robot localization using exemplars. The process 400 may be performed by one or more electronic systems, for example, the system 100 of FIG. 1.

The process 400 includes sending a request for exemplar data, where the request includes data obtained by a drone (402). For example, the drone 113 can generate the exemplar request 118 and send the request 118 to the control unit 108. The exemplar request 118 may include data types similar to the data types of the data 104. In the example of FIG. 1, the exemplar request 118 includes data of the same types as data in the data 104. For example, the exemplar request 118 includes LiDAR data 108*a*, visual data 108*b*, inertial data 108*c*, and positioning data 108*d* and the data frame 106 of the data 104 similarly includes LiDAR data 106*a*, visual data 106*b*, inertial data 106*c*, and positioning data 106*d*.

In some implementations, a drone sends a request for exemplars of a route. For example, the drone 113 can generate a request that includes an identifier of a route or a number of locations that define a route. The drone 113 can send the request to the control unit 108. The control unit 108 can determine, based on the route or the locations that define a route, one or more exemplars to provide to the drone 113. The control unit 108 can provide, to the drone 113, all exemplars within a threshold distance from locations on the route, a subset of exemplars within a threshold distance from locations on the route, or exemplars associated with an identifier used to index exemplars of the route in the exemplar database (e.g., the identifier of a route from a living room to a kitchen may be used by the control unit 108 to search the exemplar database 112 for exemplars on the route from the living room to the kitchen). The subset may include exemplars in a particular section of the route or exemplars spaced along the route a predetermined distance apart, in part, to reduce bandwidth requirements and efficiency. The control unit 108 may determine the particular section by determining a section of the route closest to a current location of the drone 113 based on a predicted current location of the drone 113. The drone 113 may include its predicted current location in the request sent to the control unit 108.

The process 400 includes receiving, in response to the request, one or more exemplars (404). For example, as shown in stage F, the control unit 108 can provide the exemplars 122 to the drone 113. The drone 113 obtains the exemplars 122. The exemplars 122 are a subset of the exemplars stored in the exemplar database 112 that are most applicable for localization processes of the drone 113.

In some implementations, a drone that obtains data for exemplar generation requests exemplars for localization. For example, the drone 102 may obtain the data 104. The drone 102 may perform actions attributed to the drone 113. That is, the drone 102 may, after obtaining the data 104 used to generate the exemplars 110, send an exemplar request to the control unit 108. The control unit 108 can receive the request, as discussed in reference to the drone 113 and stage C. The control unit 108 can provide exemplars to the drone 102. In this way, any device in a given system may be used to obtain the data 104 and any device may request to obtain exemplars for localization.

The process 400 includes identifying a location difference between an expected location of the drone and a location indicated by the one or more exemplars (406). For example, the drone 113 may detect a feature with a size and angle in visual data obtained by the drone 113 and compare it with the feature represented in one or more of the exemplars 122. The feature may be recognized by certain characteristics, such as color or shape. A difference in size and angle between the feature represented in data obtained by the drone 113 and the feature represented in the data of the exemplars 122 may indicate a difference in where a sensor was when it obtained the corresponding data.

The process 400 includes determining the current location of the drone using the location difference (408). For example, as discussed herein, comparing features present in both data obtained by the drone 113 and data of the exemplars 122 may indicate one or more differences. The differences in characteristics of the features detected in both the data obtained by the drone 113 and data of the exemplars 122 may be used to determine a location difference. Characteristics of the features in data obtained by the drone 113 may indicate that a sensor, when obtaining the data, was at a location A. Characteristics of the features in data of the exemplars 122 may indicate that a sensor, when obtaining the data of a given exemplar, was at a location B. A location difference between location A and location B may be applied to a current location of the drone 113 to update the current location (e.g., a vector representing the location difference may be added to a coordinate set indicating the current location of the drone 113 to generate the updated current location of the drone 113).

The order of steps in the process 300 and the process 400 described above are illustrative only, and can be performed in different orders. For example, two or more of the steps 302, 304, 306, 308, and 310 can be performed concurrently or in a different order. Step 306 and step 308 can be performed concurrently by the control unit 108 or be performed as a part of a threaded process where images are selected as exemplars by one processor and determining that a second drone is in a localization phase is performed by another processor or each is performed in different threads by a single processor.

In some implementations, the process 300 or 400 can include additional steps, fewer steps, or some of the steps can be divided into multiple steps. For example, the step 308 can be optional. The process 300 can include providing representations of the images without determining that a second drone is in a localization phase, e.g., so that the second drone has representations when and if the second drone requires them.

Figure 5:
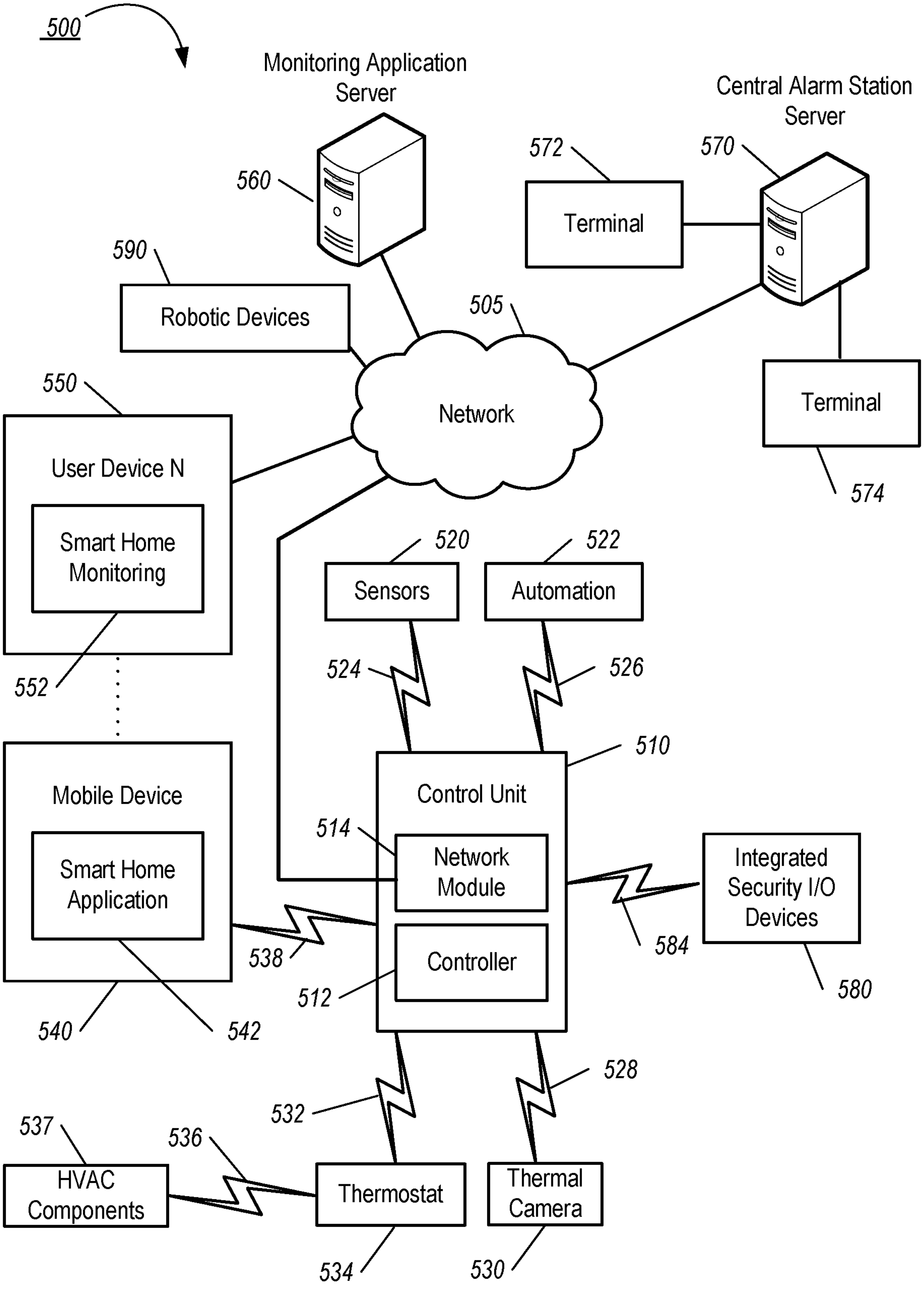
FIG. 5 is a diagram illustrating an example of a property monitoring system. Like reference numbers and designations in the various drawings indicate like elements.

FIG. 5 is a diagram illustrating an example of a property monitoring system 500. In some cases, the property monitoring system 500 may include components of the system 100 of FIG. 1. For example, actions performed by the control unit 510 may include actions performed by the control unit 108.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors 520. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The system 500 also includes one or more thermal cameras 530 that communicate with the control unit 510. The thermal camera 530 may be an IR camera or other type of thermal sensing device configured to capture thermal images of a scene. For instance, the thermal camera 530 may be configured to capture thermal images of an area within a building or home monitored by the control unit 510. The thermal camera 530 may be configured to capture single, static thermal images of the area and also video thermal images of the area in which multiple thermal images of the area are captured at a relatively high frequency (e.g., thirty images per second). The thermal camera 530 may be controlled based on commands received from the control unit 510. In some implementations, the thermal camera 530 can be an IR camera that captures thermal images by sensing radiated power in one or more IR spectral bands, including NIR, SWIR, MWIR, and/or LWIR spectral bands.

The thermal camera 530 may be triggered by several different types of techniques. For instance, a Passive Infra-Red (PIR) motion sensor may be built into the thermal camera 530 and used to trigger the thermal camera 530 to capture one or more thermal images when motion is detected. The thermal camera 530 also may include a microwave motion sensor built into the camera and used to trigger the thermal camera 530 to capture one or more thermal images when motion is detected. The thermal camera 530 may have a "normally open" or "normally closed" digital input that can trigger capture of one or more thermal images when external sensors (e.g., the sensors 520, PIR, door/window, etc.) detect motion or other events. In some implementations, the thermal camera 530 receives a command to capture an image when external devices detect motion or another potential alarm event. The thermal camera 530 may receive the command from the controller 512 or directly from one of the sensors 520.

In some examples, the thermal camera 530 triggers integrated or external illuminators (e.g., Infra-Red or other lights controlled by the property automation controls 522, etc.) to improve image quality. An integrated or separate light sensor may be used to determine if illumination is desired and may result in increased image quality.

The thermal camera 530 may be programmed with any combination of time/day schedules, monitoring system status (e.g., "armed stay," "armed away," "unarmed"), or other variables to determine whether images should be captured or not when triggers occur. The thermal camera 530 may enter a low-power mode when not capturing images. In this case, the thermal camera 530 may wake periodically to check for inbound messages from the controller 512. The thermal camera 530 may be powered by internal, replaceable batteries if located remotely from the control unit 510. The thermal camera 530 may employ a small solar cell to recharge the battery when light is available. Alternatively, the thermal camera 530 may be powered by the controller's 512 power supply if the thermal camera 530 is co-located with the controller 512.

In some implementations, the thermal camera 530 communicates directly with the monitoring server 560 over the Internet. In these implementations, thermal image data captured by the thermal camera 530 does not pass through the control unit 510 and the thermal camera 530 receives commands related to operation from the monitoring server 560.

In some implementations, the system 500 includes one or more visible light cameras, which can operate similarly to the thermal camera 530, but detect light energy in the visible wavelength spectral bands. The one or more visible light cameras can perform various operations and functions within the property monitoring system 500. For example, the visible light cameras can capture images of one or more areas of the property, which the cameras, the control unit, and/or another computer system of the monitoring system 500 can process and analyze.

The system 500 also includes one or more property automation controls 522 that communicate with the control unit to perform monitoring. The property automation controls 522 are connected to one or more devices connected to the system 500 and enable automation of actions at the property. For instance, the property automation controls 522 may be connected to one or more lighting systems and may be configured to control operation of the one or more lighting systems. Also, the property automation controls 522 may be connected to one or more electronic locks at the property and may be configured to control operation of the one or more electronic locks (e.g., control Z-Wave locks using wireless communications in the Z-Wave protocol). Further, the property automation controls 522 may be connected to one or more appliances at the property and may be configured to control operation of the one or more appliances. The property automation controls 522 may include multiple modules that are each specific to the type of device being controlled in an automated manner. The property automation controls 522 may control the one or more devices based on commands received from the control unit 510. For instance, the property automation controls 522 may interrupt power delivery to a particular outlet of the property or induce movement of a smart window shade of the property.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at the property and/or environmental data at the home, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more property automation controls 522.

In some implementations, a module 537 is connected to one or more components of an HVAC system associated with the property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robot that are capable of moving and taking actions that assist in home monitoring. For example, the robotic devices 590 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property).

In some cases, the robotic devices 590 may be robotic devices 590 that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a property. In these examples, the robotic devices 590 include sensors and control processors that guide movement of the robotic devices 590 within the property. For instance, the robotic devices 590 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the property and guide movement of the robotic devices 590 in a manner that avoids the walls and other obstacles.

In addition, the robotic devices 590 may store data that describes attributes of the property. For instance, the robotic devices 590 may store a floorplan of a building on the property and/or a three-dimensional model of the property that enables the robotic devices 590 to navigate the property. During initial configuration, the robotic devices 590 may receive the data describing attributes of the property, determine a frame of reference to the data (e.g., a property or reference location in the property), and navigate the property based on the frame of reference and the data describing attributes of the property. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, one or more of the thermal cameras 530 may be mounted on one or more of the robotic devices 590.

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the property. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the property. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid state electronic storage that enables the robotic devices 590 to store applications, configuration data, collected sensor data, and/or any other type of information available to the robotic devices 590.

The robotic devices 590 can be associated with one or more charging stations. The charging stations may be located at predefined home base or reference locations at the property. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact-based charging stations and/or wireless charging stations. For contact-based charging stations, the robotic devices 590 may have readily accessible points of contact that the robotic devices 590 are capable of positioning and mating with a corresponding contact on the charging station. For instance, a helicopter type robotic device 590 may have an electronic contact on a portion of its landing gear that rests on and mates with an electronic pad of a charging station when the helicopter type robotic device 590 lands on the charging station. The electronic contact on the robotic device 590 may include a cover that opens to expose the electronic contact when the robotic device 590 is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the property may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device 590 may always use a first charging station and a second robotic device 590 may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the property that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device 590 to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the property automation controls 522, the thermal camera 530, the thermostat 534, and the integrated security devices 580 may communicate with the controller 512 over communication links 524, 526, 528, 532, and 584. The communication links 524, 526, 528, 532, and 584 may be a wired or wireless data pathway configured to transmit signals from the sensors 520, the property automation controls 522, the thermal camera 530, the thermostat 534, and the integrated security devices 580 to the controller 512. The sensors 520, the property automation controls 522, the thermal camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, and 584 may include a local network. The sensors 520, the property automation controls 522, the thermal camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is one or more electronic devices configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor data, thermal image data, and other monitoring system data received from the monitoring system and perform analysis of the sensor data, thermal image data, and other monitoring system data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, thermal image, and other data to determine an activity pattern of a resident of the property monitored by the system 500. In some implementations, the monitoring server 560 may analyze the data for alarm conditions or may determine and perform actions at the property by issuing commands to one or more of the automation controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and

574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the thermal camera 530 and/or reports related to the monitoring system. Although FIG. 5 illustrates two user devices for brevity, actual implementations may include more (and, perhaps, many more) or fewer user devices.

The smart home application 542 and the smart home user interface 552 can allow a user to interface with the property monitoring system 500, for example, allowing the user to view monitoring system settings, adjust monitoring system parameters, customize monitoring system rules, and receive and view monitoring system messages.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (Ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors 520 and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system 500.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the property automation controls 522, the thermal camera 530, and the robotic devices 590. The one or more user devices 540 and 550 receive data directly from the sensors 520, the property automation controls 522, the thermal camera 530, and the robotic devices 590 (i.e., the monitoring system components) and sends data directly to the monitoring system components. The one or more user devices 540, 550 provide the appropriate interfaces/processing to provide visual surveillance and reporting.

In other implementations, the system 500 further includes network 505 and the sensors 520, the property automation controls 522, the thermal camera 530, the thermostat 534, and the robotic devices 59 are configured to communicate sensor and image data to the one or more user devices 540 and 550 over network 505 (e.g., the Internet, cellular network, etc.). In yet another implementation, the sensors 520, the property automation controls 522, the thermal camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the property automation controls 522, the thermal camera 530, the thermostat 534, and the robotic devices 590 to a pathway over network 505 when the one or more user devices 540 and 550 are farther from the sensors 520, the property automation controls 522, the thermal camera 530, the thermostat 534, and the robotic devices 590. In some examples, the system leverages GPS information from the one or more user devices 540 and 550 to determine whether the one or more user devices 540 and 550 are close enough to the monitoring system components to use the direct local pathway or whether the one or more user devices 540 and 550 are far enough from the monitoring system components that the pathway over network 505 is required. In other examples, the system leverages status communications (e.g., pinging) between the one or more user devices 540 and 550 and the sensors 520, the property automation controls 522, the thermal camera 530, the thermostat 534, and the robotic devices 590 to determine whether communication using the direct local pathway is possible. If communication using the direct local pathway is possible, the one or more user devices 540 and 550 communicate with the sensors 520, the property automation controls 522, the thermal camera 530, the thermostat 534, and the robotic devices 590 using the direct local pathway. If communication using the direct local pathway is not possible, the one or more user devices 540 and 550 communicate with the monitoring system components using the pathway over network 505.

In some implementations, the system 500 provides end users with access to thermal images captured by the thermal camera 530 to aid in decision making. The system 500 may transmit the thermal images captured by the thermal camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 530 or other cameras of the system 500). In these implementations, the thermal camera 530 may be set to capture thermal images on a periodic basis when the alarm system is armed in an "armed away" state, but set not to capture images when the alarm system is armed in an "armed stay" or "unarmed" state. In addition, the thermal camera 530 may be triggered to begin capturing thermal images when the alarm system detects an event, such as an alarm event, a door-opening event for a door that leads to an area within a field of view of the thermal camera 530, or motion in the area within the field of view of the thermal camera 530. In other implementations, the thermal camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure. A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the processes 300 and 400 of FIG. 3 and FIG. 4 can be performed in a different order and still achieve desirable results.

What is claimed is:

1. A method comprising:

obtaining sensor data from a robot indicating a traversed route at a property and that was captured at a captured sampling rate, wherein the sensor data indicates at least a portion of the traversed route at the property;

determining a data processing sampling rate for sampling one or more data frames of the sensor data;

selecting, from a plurality of sensor data subsets that each include data for navigating using localization and that are each for a different data processing sampling rate, a subset of the sensor data for use during a localization process using the determined data processing sampling rate, wherein the subset of the sensor data includes data frames of the sensor data obtained along the route at the property; and storing, in memory, the selected subset of the sensor data for use as localization exemplars during a localization process by a second robot.

2. The method of claim 1, comprising detecting one or more first features in the sensor data, wherein:

determining the data processing sampling rate comprises determining, using the detected first features, the data processing sampling rate that is different data than and based on the one or more first features; and selecting the subset of the sensor data comprises selecting, using the data processing sampling rate, at least part of the subset of the sensor data.

3. The method of claim 2, wherein the one or more first features include one or more of the following: detection of objects, detection of object characteristics, detection of objects or characteristics in LiDAR data, visual data, inertial data, velocity of the robot, or positioning data.

4. The method of claim 1, comprising:

determining the data processing sampling rate for a portion of the route; and selecting, (i) using the data processing sampling rate and (ii) as at least part of the subset of the sensor data, a subset of sensor data obtained along the portion of the route.

5. The method of claim 1, wherein the data processing sampling rate indicates a number of data frames to be selected as part of the subset of the sensor data over a period of time or over a number of data frames captured in the sensor data.

6. The method of claim 1, wherein obtaining the sensor data from the robot comprises obtaining location data from the robot indicating an approximate location of the robot, and wherein storing the selected subset of the sensor data comprises storing the location data from the robot.

7. The method of claim 1, comprising:

obtaining an exemplar request from the robot or another robot at the property;

selecting, using the exemplar request, one or more data frames of the subset of the sensor data; and providing the selected data frames as a localization exemplar to the requesting robot.

8. A system comprising one or more computers and one or more storage devices on which are stored instructions that are operable, when executed by the one or more computers, to cause the one or more computers to perform operations comprising:

obtaining sensor data from a robot indicating a traversed route at a property and that was captured at a captured sampling rate, wherein the sensor data indicates at least a portion of the traversed route at the property;

determining a data processing sampling rate for sampling one or more data frames of the sensor data;

selecting, from a plurality of sensor data subsets that each include data for navigating using localization and that are each for a different data processing sampling rate, a subset of the sensor data for use during a localization process using the determined data processing sampling rate, wherein the subset of the sensor data includes data frames of the sensor data obtained along the route at the property; and storing, in memory, the selected subset of the sensor data for use as localization exemplars during a localization process by a second robot.

9. The system of claim 8, wherein the operations comprise detecting one or more first features in the sensor data, wherein:

determining the data processing sampling rate comprises determining, using the detected first features, the data processing sampling rate that is different data than the one or more first features; and selecting the subset of the sensor data comprises selecting, using the data processing sampling rate, at least part of the subset of the sensor data.

10. The system of claim 9, wherein the one or more first features include one or more of the following: detection of objects, detection of object characteristics, detection of objects or characteristics in LiDAR data, visual data, inertial data, velocity of the robot, or positioning data.

11. The system of claim 8, wherein the operations comprise:

determining the data processing sampling rate for a portion of the route; and selecting, (i) using the data processing sampling rate and (ii) as at least part of the subset of the sensor data, a subset of sensor data obtained along the portion of the route.

12. The system of claim 8, wherein the data processing sampling rate indicates a number of data frames to be selected as part of the subset of the sensor data over a period of time or over a number of data frames captured in the sensor data.

13. The system of claim 8, wherein obtaining the sensor data from the robot comprises obtaining location data from the robot indicating an approximate location of the robot, and wherein storing the selected subset of the sensor data comprises storing the location data from the robot.

14. One or more computer storage media encoded with instructions that, when executed by one or more computers, cause the one or more computers to perform operations comprising:

obtaining sensor data from a robot indicating a traversed route at a property and that was captured at a captured sampling rate, wherein the sensor data indicates at least a portion of the traversed route at the property;

determining a data processing sampling rate for sampling one or more data frames of the sensor data;

selecting, from a plurality of sensor data subsets that each include data for navigating using localization and that are each for a different data processing sampling rate, a subset of the sensor data for use during a localization process using the determined data processing sampling rate, wherein the subset of the sensor data includes data frames of the sensor data obtained along the route at the property; and storing, in memory, the selected subset of the sensor data for use as localization exemplars during a localization process by a second robot.

15. The method of claim 1, comprising:

selecting, as part of the subset of the sensor data, (i) a first data frame of a first type of data from the sensor data and (ii) a second data frame of a second type of data from the sensor data, wherein the first type of data is different than the second type of data; and storing, as part of the selected subset of the sensor data, (i) the first data frame of the first type of data and (ii) the second data frame of the second type of data.

16. The method of claim 15, wherein the first type of data includes non-visual data and the second type of data includes visual data.

17. The method of claim 1, comprising:

determining, using the data processing sampling rate, to skip selecting a second, different subset of the sensor data for use during the localization process, wherein the sensor data comprises the subset and the second subset.

18. The method of claim 2, comprising:

detecting one or more second features in the sensor data, wherein the one or more second features are different than the one or more first features;

determining, using the detected second features, a second data processing sampling rate; and selecting, using the second data processing sampling rate, at least part of the subset of the sensor data.

19. The method of claim 1, wherein the captured sampling rate comprises a different rate than the data processing sampling rate.

* * * * *